(12) United States Patent
Han

(10) Patent No.: US 8,227,110 B2
(45) Date of Patent: Jul. 24, 2012

(54) SECONDARY BATTERY

(75) Inventor: Kyu-Nam Han, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 410 days.

(21) Appl. No.: 11/166,776

(22) Filed: Jun. 27, 2005

(65) Prior Publication Data

US 2006/0019160 A1    Jan. 26, 2006

(30) Foreign Application Priority Data

Jun. 25, 2004 (KR) .................. 10-2004-0048001

(51) Int. Cl.
*H01M 2/04* (2006.01)
(52) U.S. Cl. ........................ 429/175; 429/122
(58) Field of Classification Search .................. None
See application file for complete search history.

(56) References Cited

U.S. PATENT DOCUMENTS

| 4,774,634 A * | 9/1988 | Tate et al. ............... 361/760 |
| 5,631,101 A * | 5/1997 | Amero, Jr. ............... 429/90 |
| 6,524,739 B1 * | 2/2003 | Iwaizono et al. ............ 429/61 |
| 2002/0142195 A1 * | 10/2002 | Ehara ........................ 429/7 |
| 2006/0057458 A1 * | 3/2006 | O'Dea et al. ............... 429/164 |

FOREIGN PATENT DOCUMENTS

| CN | 1465109 | 12/2003 |
| JP | 2002-050884 | 2/2002 |
| JP | 2002-330540 | 11/2002 |
| JP | 2003-017016 | 1/2003 |
| JP | 2003-017026 | 1/2003 |
| JP | 2003-197270 | 7/2003 |
| JP | 2003-308881 | * 10/2003 |
| JP | 2004-079416 | 3/2004 |

OTHER PUBLICATIONS

IPDL machine translation of JP 2003-308881.*

* cited by examiner

*Primary Examiner* — Barbara Gilliam
*Assistant Examiner* — Maria J Laios
(74) *Attorney, Agent, or Firm* — Robert E. Bushnell, Esq.

(57) ABSTRACT

A secondary battery includes: a bare cell having an electrode assembly including two electrodes and a separator arranged between the two electrodes, a cell container having an opening and adapted to contain the electrode assembly, and a cap assembly adapted to cover the opening; and an accessory unit having a protective circuit module and adapted to be electrically connected to the bare cell via at least one electrode from outside of the bare cell. The accessory unit is adapted to be affixed to the bare cell with an adhesive member arranged in at least a portion of facing surfaces of both the bare cell and the accessory unit.

8 Claims, 3 Drawing Sheets

SECONDARY BATTERY

BACKGROUND OF THE INVENTION

This application makes reference to, incorporates the same herein, and claims all benefits accruing under 35 U.S.C. §119 from an application for SECONDARY BATTERY earlier filed in the Korean Intellectual Property Office on 25$^{th}$ of Jun. 2004 and there duly assigned Serial No. 10-2004-0048001.

BACKGROUND OF INVENTION

1. Field of the Invention

The present invention relates to a secondary battery, and more particularly, to a secondary battery including a bare cell with an accessory unit having a protective circuit module.

2. Description of the Related Art

Recently, secondary batteries have been researched and developed in a variety of fields because of many advantages such as rechargeability, small size, and large capacity. Nowadays, Nickel Hydride (Ni-MH), lithium (Li), and lithium ion batteries have been developed and are used in the art.

In such secondary batteries, most of the bare cells are formed by arranging an electrode assembly in a cell container, covering the cell container with its cover, injecting an electrolyte into the internal space of the cell container, and sealing it. Typically, the electrode assembly has a positive electrode, a negative electrode, and a separator. The cell container can be made of an iron frame, but is preferably made of aluminum or an aluminum alloy due to its intrinsic properties such as a light weight and high long-term erosion-resistance.

On the other hand, the secondary battery is very dangerous because it has the ability to discharge abundant energy in a short time. In other words, the secondary battery receives and accumulates energy from other energy sources during a charging process, and finally becomes high explosive energy storage when fully charged. If an abnormality such as an internal short occurs in a full charge condition or during a charging process, a high capacity of energy accumulated in the battery would be abruptly discharged in a short time, thereby causing accidents such as fire or explosion.

The lithium secondary battery widely used in recent years is particularly flammable and ignitable in an abnormal condition because the lithium itself has a high activity. The lithium-ion secondary battery is safer than the lithium battery because it uses only lithium ions instead of lithium metal. However, the lithium ion secondary battery is still dangerous because the material used for fabricating a negative electrode or a non-aqueous electrolyte is flammable.

For this reason, typical secondary batteries have several kinds of safety devices for preventing fire or explosion caused by an abnormality in a full charge condition or in a charging process. The safety devices are connected to positive and negative electrode terminals of the bare cell via a conductive structure called a lead plate. The safety devices prevent fire or explosion by cutting off electrical currents when a voltage in the battery cell is abruptly raised because the battery is heated to a high temperature or excessively charged/discharged. For example, the safety devices connected to the bare cell can include a protection circuit for cutting off a current flow when abnormal currents or voltages are detected, a Positive Temperature Coefficient (PTC) device which is operable at a high temperature, and a bimetal device.

Typically, the secondary battery is manufactured by assembling the bare cell with the safety device and packaging the assembled battery in a separate pack. Otherwise, the secondary battery is manufactured by electrically connecting the bare cell and the safety device including the protective circuit module and then mechanically assembling them by filling the space between them with a resin or coating them together to provide a secondary battery.

A lithium ion battery pack includes a protective circuit module arranged facing a surface of the bare cell on which the electrode terminals are provided. The space between the bare cell and the protective circuit module is filled with a resin to form a battery. The resin can be injected into the space until the outer surface of the protective circuit module is covered but the external electrical terminals are exposed.

The bare cell has a positive electrode terminal and a negative electrode terminal on its surface facing the protective circuit module. The positive electrode terminal can be a cap plate itself made of aluminum or an aluminum alloy or a metallic plate containing nickel formed on a cap plate. The negative electrode terminal protrudes from the cap plate and is electrically insulated from the cap plate by a gasket interposed therebetween.

The protective circuit module can be fabricated by forming circuitry on a plastic panel, and has outer electrical terminals on its outer surface. The size and the shape of the protective circuit module are similar to those of a corresponding surface (i.e., the surface of the cap plate) of the bare cell.

A circuit unit and connection terminals are also provided on the inner surface of the protective circuit module, which is opposite to the side of the outer electrical terminals. The circuit unit has a safety device, i.e, the protection circuit for protecting the battery from over-charging/discharging. The circuit unit is electrically connected to the outer electrical terminals via a conductive structure passing through the protective circuit module.

Connection leads and an insulation plate are also provided between the bare cell and the protective circuit module. The connection leads are typically made of nickel and formed to provide electrical connection between the cap plate of the bare cell and the connection terminals of the protective circuit module, with an L-shaped or planar structure. For example, resistance spot welding can be used to respectively bond the connection leads to the terminals. A breaker can be provided in the connection lead between the protective circuit module and the negative electrode terminal. If the breaker is provided in the connection lead, the breaker is excluded from the circuit unit of the protective circuit module. The insulation plate is provided to insulate the connection lead connected to the negative electrode terminal from the cap plate which functions as a positive electrode.

When the bare cell and the accessory unit including the protective circuit module are assembled together and then packaged by molding a resin to form the packaged battery, the bond strength between the bare cell and the plastic molded part can be weak. This is because a resin molded part used to fix the accessories to the bare cell is made of a resin whereas the bare cell or the cap plate is made of metal, and the bonding area is not sufficient.

In order to increase the bond strength, it can be possible to enlarge the area of the bond structure such as the lead plate or provide a separate reinforcement structure. For example, a separate reinforcement structure can be welded to the cap plate, and then, a space between the reinforcement structure and the bare cell can be filled with a resin to encapsulate the reinforcement structure. However, additional materials and processes such as welding must be performed to form such a reinforcement structure.

Moreover, a mold facility must be used to inject a resin into the space between the bare cell and the protective circuit module. Then, the molded resin must be cured, and the mold must be blanked after completing the mold process. Therefore, the process becomes cumbersome. Furthermore, when the resin is injected into the space between the protective circuit module and the bare cell, the resin is not always uniform. More particularly, when the reinforcement structure is complicated, it is more difficult to uniformly fill the space with the resin.

On the other hand, after the resin injected into the space between the bare cell and the protective circuit module has hardened, since the connection port of the terminal, the protective circuit module, and the PTC are buried in the resin, they can not be separated. Therefore, reusable accessories must be discarded together with the used bare cell 100 when the life span of the used bare cell has been reached.

SUMMARY OF THE INVENTION

Accordingly, in order to solve the aforementioned problems, the present invention provides a secondary battery having a structure for safely and easily assembling a bare cell with an accessory unit including a safety device such as a protective circuit module.

Also, the present invention provides a secondary battery eliminating cumbersome works and problems of a resin mold process, that the resin is not uniformly filled in a space between the accessory unit and the bare cell and a bond strength between the accessory unit and the bare cell is not sufficient.

According to an aspect of the present invention, a secondary battery is provided comprising: a bare cell having an electrode assembly including two electrodes and a separator arranged between the two electrodes, a cell container having an opening and adapted to contain the electrode assembly, and a cap assembly adapted to cover the opening; and an accessory unit having a protective circuit module and adapted to be electrically connected to the bare cell via at least one electrode from outside of the bare cell; the accessory unit is adapted to be affixed to the bare cell with an adhesive member arranged in at least a portion of facing surfaces of both the bare cell and the accessory unit.

The protective circuit module preferably comprises at least one safety device; the at least one electrode of the accessory unit is preferably arranged on a side thereof facing the cap assembly, and the accessory unit preferably has at least one outer electrical terminal arranged on another side of the accessory unit.

The protective circuit module is preferably adapted to be affixed within the accessory unit by a resin mold.

The side facing the cap assembly preferably has at least one electrical connection member; the another side of the protective circuit module preferably has at least one outer electrical terminal; and the resin mold is preferably adapted to expose the electrical connection member and the outer electrical terminal.

The accessory unit preferably comprises a resin assembly including a resin board with accessories including the protective circuit module.

The adhesive member preferably comprises a material selected from a group consisting of a thermosetting adhesive, a photo-curing adhesive, and a double-coated fixing tape.

According to another aspect of the present invention, a secondary battery is provided comprising: a bare cell having an electrode assembly including two electrodes and a separator arranged between the two electrodes, a cell container having an opening and adapted to contain the electrode assembly, and a cap assembly adapted to cover the opening; and an accessory unit having a protective circuit module and adapted to be electrically connected to the bare cell via at least one electrode from outside of the bare cell; the protective circuit module includes: at least one safety device, at least one mechanical connection member and electrical connection member arranged on one side facing the cap assembly and at least one outer electrical terminal arranged on another side thereof; the accessory unit includes a molding resin adapted to expose the mechanical connection member, the electrical connection member, and the outer electrical terminal; and the mechanical connection member of the accessory unit is mechanically or electrically attached to the cap plate with an adhesive member.

The mechanical connection member is preferably conductive so as to be adapted to be electrically connected to protective circuit module.

The electrical connection member is preferably adapted to be electrically connected to the electrical terminal of the cap plate.

A surface of the electrical terminal of the cap plate preferably includes a coating having excellent electrical conductivity.

The coating preferably comprises a material selected from a group consisting of gold, silver, and solder.

The adhesive member is preferably arranged on a surface of the cap plate in a position corresponding to that of the mechanical connection member.

The adhesive member is preferably selected from a group consisting of a thermosetting adhesive, a photo-curing adhesive, and a double-coated fixing tape.

The adhesive member is preferably electrically conductive.

The secondary battery preferably further comprises at least one conductive lead adapted to electrically connect the accessory unit to the bare cell.

One side of the conductive lead is preferably adapted to be welded to the electrical terminal of the cap plate, and the other side of the conductive lead is preferably adapted to be welded to the cap plate of the cap assembly.

The conductive lead preferably has one or more folding lines adapted to fold a length of the conductive lead upon assembling the accessory unit with the cap assembly.

A lower surface of the accessory unit preferably includes a groove adapted to store the conductive lead.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
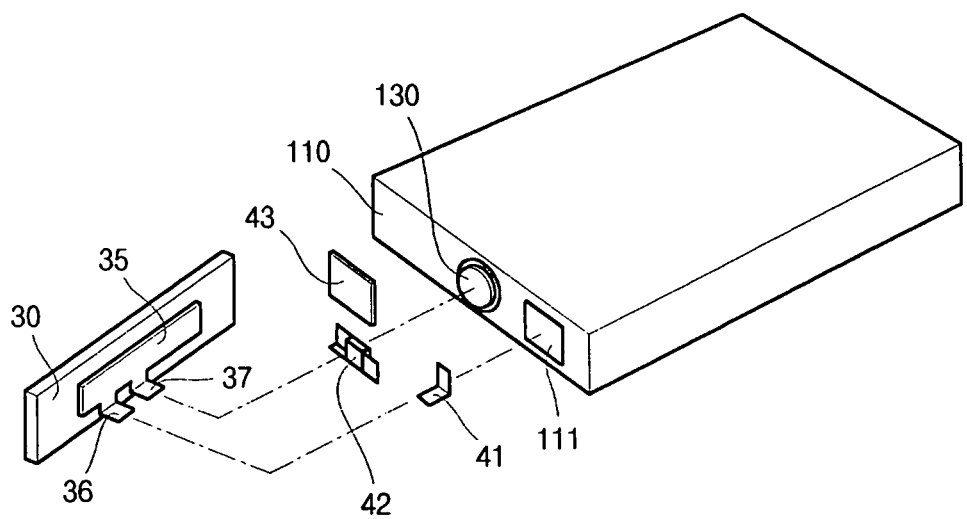
FIG. 1 is an exploded perspective view of an example of a lithium ion battery pack before assembling the bare cell with the safety device.
Figure 2:
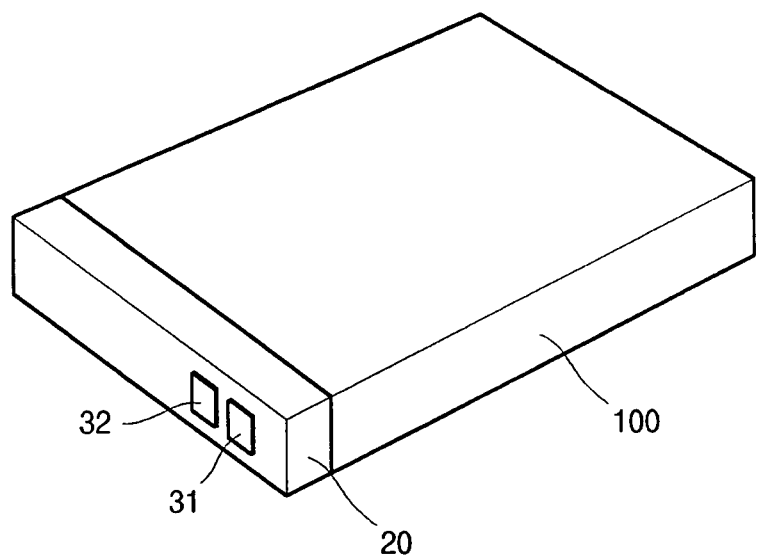
FIG. 2 is a perspective view of an assembled lithium ion battery pack.

FIG. 1 is an exploded perspective view of an example of a lithium ion battery pack before assembling the bare cell with the safety device, and FIG. 2 is a perspective view of an assembled lithium ion battery pack.

Referring to FIGS. 1 and 2, the protective circuit module 30 is arranged facing a surface of the bare cell on which the electrode terminals 111 and 130 are provided. The space between the bare cell 100 and the protective circuit module 30 is filled with a resin 20 to form a battery as shown in FIG. 2. The resin 20 can be injected into the space until the outer surface of the protective circuit module is covered but the external electrical terminals 31 and 32 are exposed.

The bare cell 100 has a positive electrode terminal 111 and a negative electrode terminal 130 on its surface facing the protective circuit module 30. The positive electrode terminal 111 can be a cap plate itself made of aluminum or an aluminum alloy or a metallic plate containing nickel formed on a cap plate. The negative electrode terminal 130 protrudes from the cap plate and is electrically insulated from the cap plate 110 by a gasket interposed therebetween.

The protective circuit module 30 can be fabricated by forming circuitry on a plastic panel, and has outer electrical terminals 31 and 32 on its outer surface. The size and the shape of the protective circuit module 30 are similar to those of a corresponding surface (i.e., the surface of the cap plate) of the bare cell 100.

A circuit unit 35 and connection terminals 36 and 37 are also provided on the inner surface of the protective circuit module 30, which is opposite to the side of the outer electrical terminals 31 and 32. The circuit unit 35 has a safety device, i.e, the protection circuit for protecting the battery from overcharging/discharging. The circuit unit 35 is electrically connected to the outer electrical terminals 31 and 32 via a conductive structure passing through the protective circuit module 30.

Connection leads 41 and 42 and an insulation plate 43 are also provided between the bare cell 100 and the protective circuit module 30. The connection leads 41 and 42 are typically made of nickel and formed to provide electrical connection between the cap plate 110 of the bare cell 100 and the connection terminals 36 and 37 of the protective circuit module 30, with an L-shaped or planar structure. For example, resistance spot welding can be used to respectively bond the connection leads 41 and 42 to the terminals 36 and 37. A breaker can be provided in the connection lead 42 between the protective circuit module and the negative electrode terminal. If the breaker is provided in the connection lead 42, the breaker is excluded from the circuit unit 35 of the protective circuit module 30. The insulation plate 43 is provided to insulate the connection lead 42 connected to the negative electrode terminal 130 from the cap plate which functions as a positive electrode.

When the bare cell 100 and the accessory unit including the protective circuit module 30 are assembled together and then packaged by molding a resin to form the packaged battery as shown in FIG. 2, the bond strength between the bare cell 100 and the resin 20 can be weak. This is because a resin 20 used to fix the accessories to the bare cell 100 is made of a resin whereas the bare cell 100 or the cap plate 110 is made of metal, and the bonding area is not sufficient.

In order to increase the bond strength, it can be possible to enlarge the area of the bond structure such as the lead plate or provide a separate reinforcement structure. For example, a separate reinforcement structure can be welded to the cap plate, and then, a space between the reinforcement structure and the bare cell can be filled with a resin 20 to encapsulate the reinforcement structure. However, additional materials and processes such as welding must be performed to form such a reinforcement structure.

Moreover, a mold facility must be used to inject the resin 20 into the space between the bare cell 100 and the protective circuit module 30. Then, the molded resin 20 must be cured, and the mold must be blanked after completing the mold process. Therefore, the process becomes cumbersome. Furthermore, when the resin 20 is injected into the space between the protective circuit module 30 and the bare cell, the resin is not always uniform. More particularly, when the reinforcement structure is complicated, it is more difficult to uniformly fill the space with the resin 20.

On the other hand, after the resin 20 injected into the space between the bare cell and the protective circuit module 30 has hardened, since the connection port of the terminal, the protective circuit module 30, and the PTC are buried in the resin 20, they can not be separated. Therefore, reusable accessories must be discarded together with the used bare cell 100 when the life span of the used bare cell 100 has been reached.

Exemplary embodiments of the present invention are described in detail below with reference to the accompanying drawings, so that those skilled in the art would understand and embody the present invention without difficulties.

Figure 3:
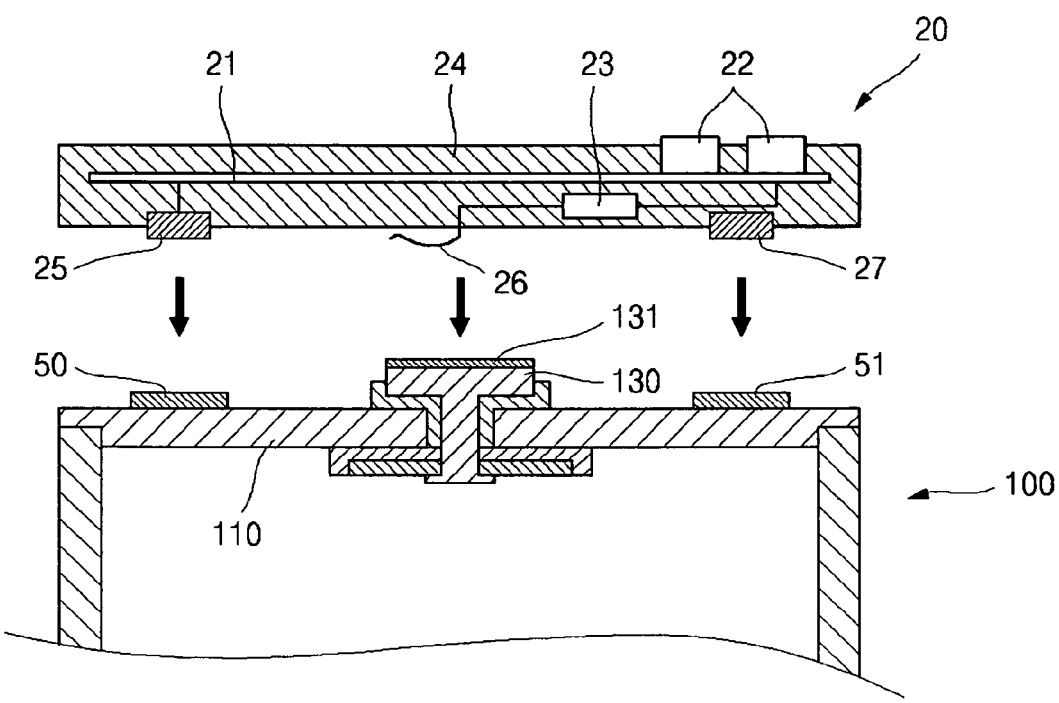
FIG. 3 is a cross-sectional view of an accessory unit and a bare cell assembled together according to an embodiment of the present invention.
Figure 4A:
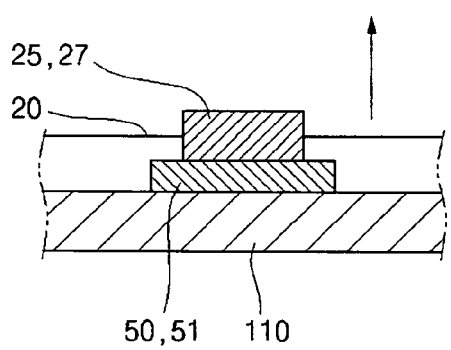
FIGS. 4A-4B are respective cross-sectional views of an assembled accessory unit and bare cell and a separated accessory unit and bare cell of the embodiment of FIG. 3
Figure 4B:
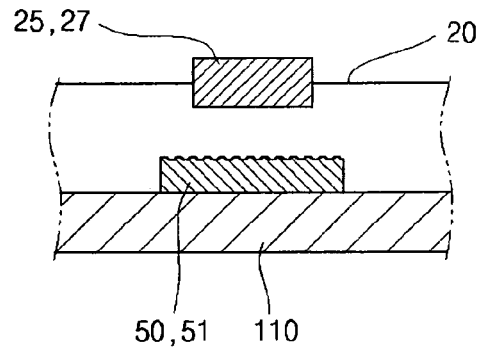

FIG. 3 is a cross-sectional view of an accessory unit and a bare cell being assembled together according to an embodiment of the present invention, and FIGS. 4A-4B are respective cross-sectional views of an assembled accessory unit and bare cell and a separated accessory unit and bare cell of the embodiment of FIG. 3.

As shown in FIGS. 3 and 4A-4B, the secondary battery comprises an accessory unit 20 and a bare cell 100. The accessory unit 20 is formed by electrically connecting the protective circuit module 21 to the bimetal switch 23 in series and molding them in a single body with a resin 24. Since the size of the accessory unit 20 is much smaller than that of the entire secondary battery including the bare cell, even a large number of accessory units can be easily fabricated, and the mold can be easily managed. In comparison with the conventional method in which the space between the accessory unit and the bare cell is filled with a resin, it is not necessary to consider a safety vent (not shown) of the cap plate 110. Furthermore, it is possible to eliminate the problem of the resin not uniformly filling the space between the accessory unit and the bare cell due to the modification or the reinforcement structure provided to improve the bond strength.

In this embodiment, it should be noted that the accessory unit 20 can be embodied by mechanically assembling the protective circuit module 21 and the bimetal switch 23 by using a resin board and metallic components, and not by using the conventional resin mold process.

The other terminals of the protective circuit module 21 and the bimetal switch 23, not incorporating into the series connection between them, are connected to the connection member 25 or 27 and the electrical connection member 26 provided on the lower surface of the accessory unit 20. Therefore, the mechanical connection member 25 electrically connected to the protective circuit module 21 also serves as an electrical connection structure. Outer terminals 22 correspond to outer terminals 31 and 32 of FIG. 2.

In addition, adhesive members 50 and 51 are provided on both longitudinal sides of the rectangular cap plate 110. The adhesive members 50 and 51 are bonded to the mechanical connection members 25 and 27 of the accessory unit 20. The adhesive members 50 and 51 can be made of, but are not limited to, a thermosetting adhesive, a photo-curing adhesive, a double-coated fixing tape, or equivalents thereof. If the thermosetting adhesive is used as the adhesive members 50 and 51, a predetermined amount of heat must be applied when the accessory unit 20 and the bare cell 100 are being bonded with pressure. If the photo-curing adhesive is used, light of a predetermined wavelength must be applied. If the double-coated adhesive is used, a relatively high pressing force must be applied. Furthermore, the adhesive members 50 and 51 are electrically conductive, so that the accessory unit 20 can be also electrically connected to the bare cell 100. Particularly, the adhesive member 50 bonded to the mechanical connection member 25 which is electrically connected to the protective circuit module 21 is preferably made of an electrically conductive material.

At the center of the cap plate, an internal electric terminal 130 (e.g., a negative electrode) of the bare cell 100 protrudes from the surface. The internal electrical terminal 130 is insulated from the cap plate of the bare cell 100. In addition, the internal electrical terminal 130 can have a coating formed on its surface to improve electrical conductivity with the electrical connection member 26 of the accessory unit 20. The coating can be made of, but is not limited to, gold (Au), silver (Ag), solder (Sn/Pb), or equivalents thereof.

Preferably, a portion of the mechanical connection members 25 and 27 are buried in the resin plate 24 of the accessory unit 20 to provide sufficient mechanical strength. Though the lower surfaces of the mechanical connection members 25 and 27 are shown to be planar in the drawing, the present invention is not limited thereto. For example, the lower surface of the mechanical connection member 25 and 27 can be embossed (not shown) to enlarge the bond area with the adhesive members 50 and 51 and improve the bond strength. Also, the present invention is not limited to the embossed surface, but can employ various shapes.

By means of such a construction, the mechanical connection members 25 and 27 can be robustly bonded and fixed to the adhesive members 50 and 51, so that the accessory unit 20 cannot be easily separated from the bare cell 100. Accordingly, the accessory unit 20 can be safely assembled with the bare cell 100 from the electrical and mechanical view points.

One end of the electrical connection member 26, of which the other end is connected to the bimetal switch 23 of the accessory unit 20, can be extended to the lower surface of the accessory unit 20 and have a plate-spring like shape protruding from the lower surface. The plate spring can make contact with the internal electrical terminal 130 of the bare cell 100 in a wide area when the bare cell 100 and the accessory unit 20 are assembled together by using the mechanical connection members 25 and 27 and the adhesive members 50 and 51.

According to the present embodiment, the safety devices of the accessory unit 21 can be safely assembled with the bare cell 100. The accessory unit 20 is not permanently assembled but rather temporarily assembled with the bare cell 100. This means that the accessory unit 20 can be removed from a used bare cell and mounted on a new bare cell for recycling even when the used bare cell 100 must be discarded.

For example, as shown in FIGS. 4A-4B, when the accessory unit 20 is pulled from the bare cell 100 by great force over a critical point of a bond strength between the mechanical connection member 25 and 27 and the adhesive member 50 and 51, the mechanical connection member 25 and 27 can be separated from the adhesive member 50 and 51, so that the accessory unit 20 can be removed from the bare cell 100. Though the adhesive member 50 and 51 on the bare cell 100 would be ruined and cannot be recycled, it does not matter because the bare cell 100 will be discarded. For this purpose, the bond strength between the adhesive member 50 and 51 and the bare cell 100 is preferably made to be greater than the bond strength between the mechanical connection member 25 and 27 and the adhesive member 50 and 51. This is because there is no need to additionally remove the adhesive member 50 and 51 from the accessory unit 20 if the adhesive member 50 and 51 is remained on the cap plate 110 when the accessory unit 20 is removed from the bare cell 100.

According to the present embodiment, it is possible to reduce cost of the secondary battery and increase user's demands. In other words, since the safety devices such as the protective circuit module, the PTC device, and the bimetal switch cannot be negligible in the battery cost, the battery cost can be significantly reduced by recycling the accessory unit.

Figure 5:
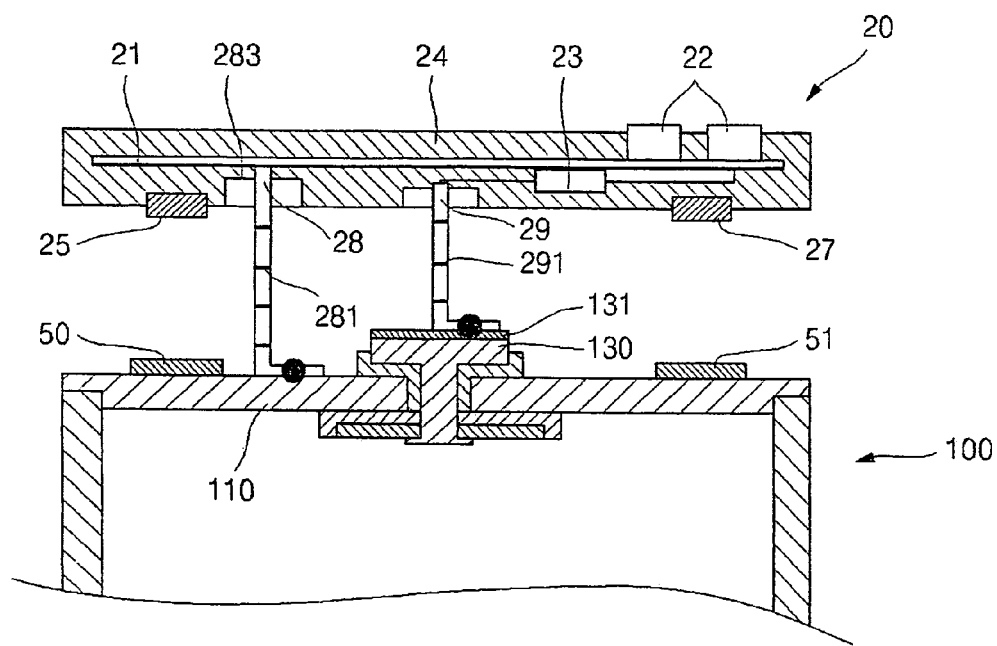
FIG. 5 is a cross-sectional view of an assembly consisting of an accessory unit and a bare cell according to another embodiment of the present invention.

FIG. 5 is a cross-sectional view of an assembly structure consisting of an accessory unit and a bare cell according to another embodiment of the present invention. Herein, like reference numerals denote like components having similar structures and functions.

Similarly, a secondary battery according to another embodiment of the present invention comprises an accessory unit 20 and a bare cell 100. The accessory unit 20 is fabricated by electrically connecting the protective circuit module 21 to the bimetal switch 23 in series, and molding them in a single body with a resin 24. Also, the accessory unit 20 can be embodied by mechanically assembling the protective circuit module 21 with the bimetal 23 by using a resin board and metallic components, and not by using the conventional resin mold process.

The other terminals of the protective circuit module 21 and the bimetal switch 23, not incorporating into the series connection between them, are connected to connection leads 28 and 29, respectively, provided on the lower surface of the accessory unit 20. The connection leads 28 and 29 are electrically connected to a portion of the cap plate 110 and internal electrical terminal (e.g., negative electrode terminal) 130, respectively, of the bare cell 100 by welding or other bonding methods. Outer terminals 22 correspond to outer terminals 22 of FIG. 4.

In addition to the connection leads 28 and 29, the mechanical connection members 25 and 27 are also provided on the lower surface of the accessory unit 20. Since the mechanical connection members 25 and 27 do not serve as an electrical terminal, they can be made of a plastic resin or a ceramic material other than metal. In order to improve the bond strength with the accessory unit 20, a portion of the mechanical connection members 25 and 27 can be buried into the resin board 24 of the accessory unit 24 or made as part of the resin board 24.

In the positions on the cap plate 110 surface of the bare cell 100, corresponding to the mechanical connection members 25 and 27 of the accessory unit 20, adhesive members 50 and 51 are provided. The adhesive members 50 and 51 will be bonded to the mechanical connection members 25 and 27, respectively, when they are assembled. The adhesive members 50 and 51 can be made of an insulation material rather than a conductive material.

The mechanical connection members 25 and 27 and the adhesive members 50 and 51 can be formed in a similar way to those shown in FIG. 3. In other words, the mechanical connection members 25 and 27 can be embossed on their surface to increase the bond strength to the bare cell 110. The present invention is not limited to such mechanical bonding structures shown in FIGS. 3 and 5.

For facilitating welding, the connection leads 28 and 29 extending from the lower surface of the accessory unit 20 are formed to be long and bent in folding lines provided at intervals so that a length of the connection lead 28 and 29 can be easily folded. As the lower surface of the accessory unit 20 approaches to the cap plate 110 of the bare cell 100 to assemble them after the connection leads are welded to the cap plate 110 and the negative electrode terminal 130 of the bare cell 100, the connection leads 28 and 29 are folded by the folding lines 281 and 291 and then piled up one by one. As a result, the long connection leads 28 and 29 are not popped out and do not cause an electrical short with other structures.

On the other hand, the thickness of the piled connection leads 28 and 29 can interfere the mechanical jointing between the bare cell 100 and the accessory unit 20. Therefore, the lower surface of the resin board of the accessory unit 20 preferably has grooves 283 formed around the connection leads 28 and 29 for storing the piled connection leads 28 and 29.

According to the present embodiment, since a welding process is used to electrically connect the connection leads 28 and 29 of the accessory unit 20 to the cap plate 110 and the internal electrical terminal 130 of the bare cell 100, it is possible to provide a safe low resistance electrical connection structure. In addition, even after the electrical terminals are welded, the mechanical jointing structure between the accessory unit and the bare cell can be disassembled by cutting the welded portion of the long connection lead 28 and 29, so that the accessory unit can be used for a new bare cell.

On the other hand, when the present invention is applied to a practical usage, it should be considered that factors such as sizes, shapes, and materials of the secondary battery components are different for each manufacturer or each type. Since such factors determine design requirements of the safety device, the safety device of the accessory unit should be optimized to each type of bare cells to be used, unless a standard for the secondary battery is established.

When a used accessory unit is recycled, it can not fit for a new bare cell to be used. This situation can be prevented by providing an identification structure indicating the sizes, locations, and number of the mechanical jointing structures used to assemble the accessory unit with the bare cell. The mechanical jointing structure can be differently formed depending on the capacity or properties of the bare cell. The identification structure can be an engagement structure formed on corresponding surfaces of both the accessory unit and the bare cell.

If the identification structure is provided depending on the type of the bare cell, it is possible to assort the accessory units with the bare cells, thereby preventing damages or dangers that can happen by using unsuitable safety devices. Preferably, the identification structure is provided in such a way that the accessory unit is commonly used for even products from different manufacturers when properties of the bare cells are within an allowable range. This would increase compatibility of the accessory unit.

Figure 6:
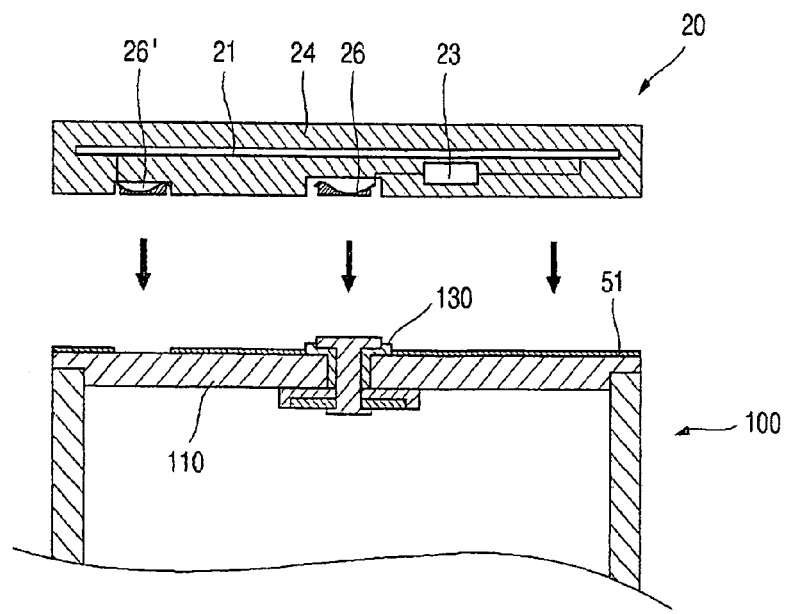
FIG. 6 is a cross-sectional view of an assembly consisting of an accessory unit and a bare cell according to yet another embodiment of the present invention.

FIG. 6 is a cross-sectional view of an assembly structure consisting of an accessory unit and a bare cell according to yet another embodiment of the present invention.

Unlike the embodiment of FIG. 3, the cap plate of the bare cell shown in FIG. 6 has an adhesive member 51 formed on its entire surface excluding the electrical coupling portions. In addition, the accessory unit 130 has a groove for storing the electrical terminal 130 on its lower surface, and has an electrical connection member 26 connected to the protective circuit module 21. Also, the accessory unit 20 has an electrical connection member 26' provided on a portion of its lower surface. The electrical connection member 26' is connected to the electrical terminal of the protective circuit module 21. The electrical connection member 26' also makes contact with a portion of the cap plate 110 when the accessory unit 20 is assembled with the bare cell 100. The electrical connection members 26 and 26' can have a high conductive and erosion-resistant coating made of a silver or gold paste on its surface. Also, the electrical connection members 26 and 26' can be a plate spring that can make contact with the corresponding surface of the bare cell 100 in a wide area with pressure when the accessory unit 20 is assembled with the bare cell 100. Such a contact structure is to provide a safe assembly structure between the accessory unit 20 and the bare cell 100 rather than recycling of the accessory unit 20.

According to the present invention, it is possible to assemble an accessory unit including a protective circuit module and a bimetal switch with a bare cell by using a safe and simple structure.

Also, it is possible to remove the accessory unit from a used bare cell without damaging the mechanical jointing components, and to recycle the removed accessory unit. Therefore, the cost of a secondary battery can be reduced.

Also, it is possible to solve problems that can happen during molding a resin in a battery pack in relation to a safe vent.

While the present invention has been particularly shown and described with reference to exemplary embodiments thereof, it will be understood by those of ordinary skill in the art that various modifications in form and detail can be made therein without departing from the spirit and scope of the present invention as defined by the following claims.

What is claimed is:

1. A secondary battery, comprising:
 a bare cell having an electrode assembly including two electrodes and a separator arranged between the two electrodes, a cell container having an opening and adapted to contain the electrode assembly, and a cap assembly adapted to cover the opening; and
 a removable accessory unit having a protective circuit module and adapted to be electrically connected to the bare cell via an electrode terminal from outside of the bare cell;
  the protective circuit module includes: at least one safety device, a first mechanical connection member, a second mechanical connection member and an electrical connection member arranged on one side facing the cap assembly and at least one outer electrical terminal arranged on another side thereof;
  the accessory unit includes a molding resin exposing the first mechanical connection member, the second mechanical connection member, the electrical connection member, and the outer electrical terminal; and
  the first mechanical connection member of the accessory unit is mechanically attached to the cap assembly with a first adhesive member, and the second mechanical connection member is mechanically and electrically attached to the cap assembly with a second adhesive member, the first and second adhesive members having a first bond strength between the first and second mechanical members and the first and second adhesive members and a second bond strength, greater than the first bond strength, between the cap assembly and the first and second adhesive members.

2. The secondary battery according to claim 1, the second mechanical member is electrically conductive so as to be adapted to be electrically connected to the protective circuit module.

3. The secondary battery according to claim 1, the electrical connection member is adapted to be electrically connected to the electrode terminal of the cap assembly.

4. The secondary battery according to claim 3, a surface of the electrode terminal of the cap assembly includes a coating having electrical conductivity.

5. The secondary battery according to claim 4, the coating comprises a material selected from a group consisting of gold, silver, and solder.

6. The secondary battery according to claim 1, the first and second adhesive members are arranged on a surface of the cap assembly in positions respectively corresponding to that of the first and second mechanical connection members.

7. The secondary battery according to claim 1, the first and second adhesive members are selected from a group consisting of a thermosetting adhesive, a photo-curing adhesive, and a double-coated double-sided fixing tape.

8. A secondary battery, comprising:
  a bare cell having an electrode assembly including two electrodes and a separator arranged between the two electrodes, a cell container having an opening and adapted to contain the electrode assembly, and a cap assembly adapted to cover the opening; and
  a removable accessory unit including a protective circuit module, a first mechanical connection member, a second mechanical connection member and an electrical connection member arranged on one side facing the cap assembly and at least one outer electrical terminal arranged on another side thereof, the protective circuit module being electrically connected to the bare cell via an electrode terminal from outside of the bare cell and electrically connected to a cap plate of the cap assembly via the second mechanical member, the accessory unit includes:
  a molding resin exposing the first mechanical connection member, the second mechanical connection member, the electrical connection member, and the outer electrical terminal;
  the protective circuit module including at least one safety device; and
  the first mechanical connection member of the accessory unit being mechanically attached to the cap assembly with a first adhesive member, and the second mechanical connection member being mechanically and electrically attached to the cap plate of the cap assembly with a second adhesive member, the first and second adhesive members having a first bond strength between the first and second mechanical members and the first and second adhesive members and a second bond strength, greater than the first bond strength, between the cap assembly and the first and second adhesive members.

* * * * *